United States Patent [19]

Taylor

[11] 3,930,960
[45] Jan. 6, 1976

[54] EVAPORATOR-CONDENSER UNIT FOR PRODUCING POTABLE WATER FROM SEWAGE

[76] Inventor: Fred W. Taylor, 60 Village Circle, Bartow, Fla. 33830

[22] Filed: May 28, 1974

[21] Appl. No.: 473,676

[52] U.S. Cl............ 202/185 R; 159/1 RW; 159/29; 203/187; 203/10; 203/237
[51] Int. Cl.² ........................................... B01D 3/02
[58] Field of Search ...... 159/24 R, 24 B, 6 R, 27 R, 159/27 B, 1 RW; 202/232, 233, 237, 234, 235, 185 A, 185 R; 203/10, 11, DIG. 5

[56] References Cited
UNITED STATES PATENTS

| | | | |
|---|---|---|---|
| 1,213,596 | 1/1917 | De Baufre | 159/24 B |
| 2,487,884 | 11/1949 | Lunt | 203/10 |
| 2,619,453 | 11/1952 | Andersen | 203/10 |
| 3,000,795 | 9/1961 | Goeldner | 203/10 |
| 3,099,607 | 7/1963 | Lustenader et al. | 203/10 |
| 3,165,435 | 1/1965 | Henszey | 159/24 B |
| 3,503,433 | 3/1970 | Riva et al. | 159/24 R |
| 3,748,234 | 7/1973 | Pottharst | 202/235 |

FOREIGN PATENTS OR APPLICATIONS

| | | | |
|---|---|---|---|
| 1,020,470 | 2/1966 | United Kingdom | 159/6 R |
| 1,381,770 | 11/1964 | France | 159/24 R |
| 800,973 | 11/1950 | Germany | 159/24 R |
| 101,393 | 1/1952 | Switzerland | 159/24 R |

Primary Examiner—Norman Yudkoff
Assistant Examiner—Frank Sever
Attorney, Agent, or Firm—Cushman, Darby & Cushman

[57] ABSTRACT

An evaporator-condenser unit is disclosed which includes an elongated enclosed chamber into which hot gases are injected to form a cyclonic stream therein. The hot gases impinge and pass around a substantial plurality of tubes containing relatively cool sanitary liquid waste. Condensation thereby forms on the tubes and is blown by the cyclonic action of the hot gas stream to the outer periphery of the cyclonic chamber where the condensation is collected and conveyed away from the chamber. At the same time, the heat from the hot gases is transferred to the liquid sanitary waste which is converted into steam in a steam expansion chest at the top of the cyclonic chamber. The steam is compressed and injected back into the hot gas stream flowing into the cyclonic chamber. The steam is then condensed on the tubes and conveyed away for appropriate utilization.

Clogging of the tubes by solid matter contained within the liquid waste is prevented by means of a periodic blow down operation which forces the material in each of the tubes under high pressure into the steam expansion chest. The steam expansion chest includes a sump which collects the liquid and solid waste and conveys same away from the evaporator-condenser unit. The cooled gases after passing through and about the plurality of tubes is conducted away from the cyclonic chamber to a discharge stack.

6 Claims, 6 Drawing Figures

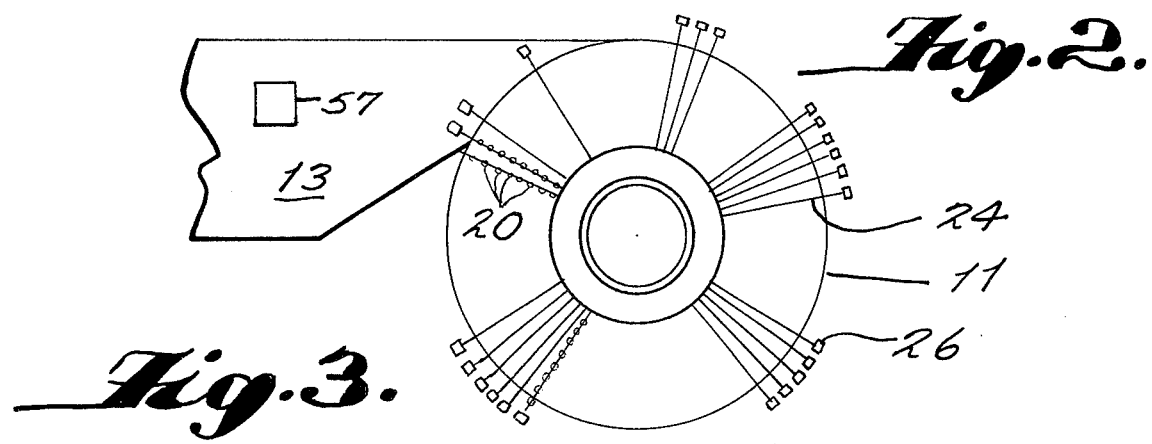
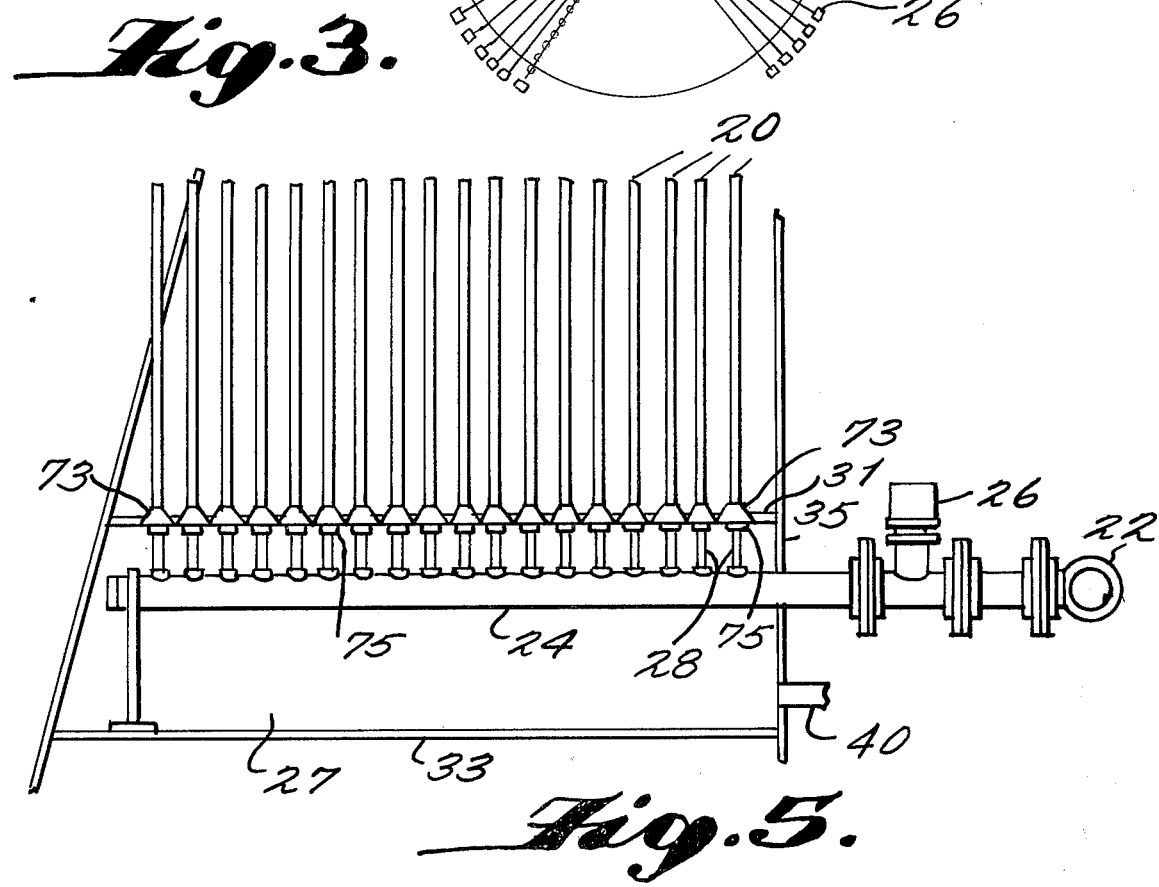
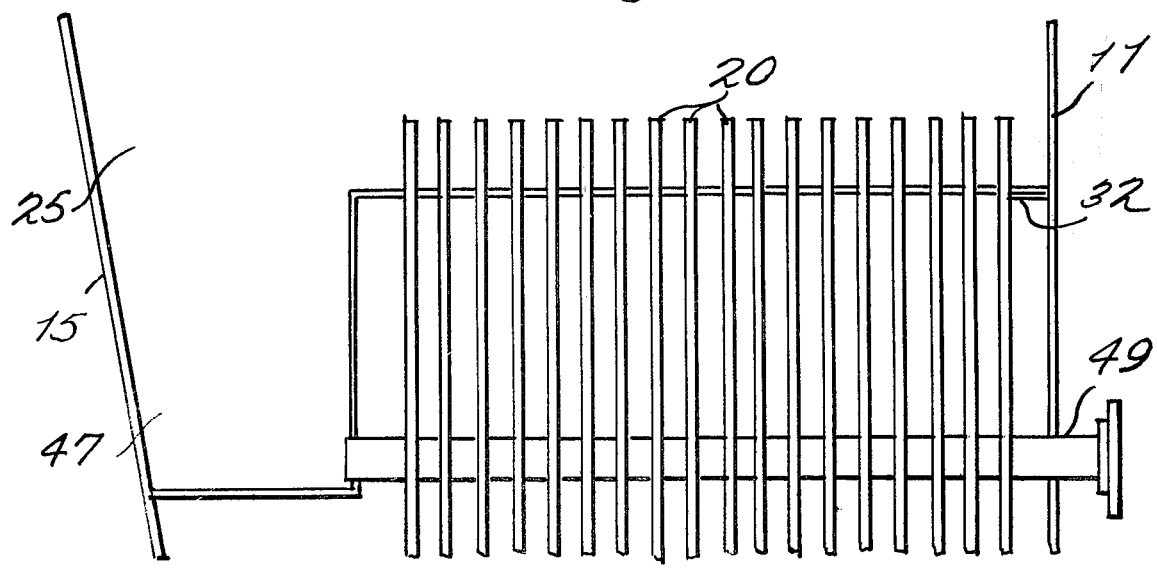

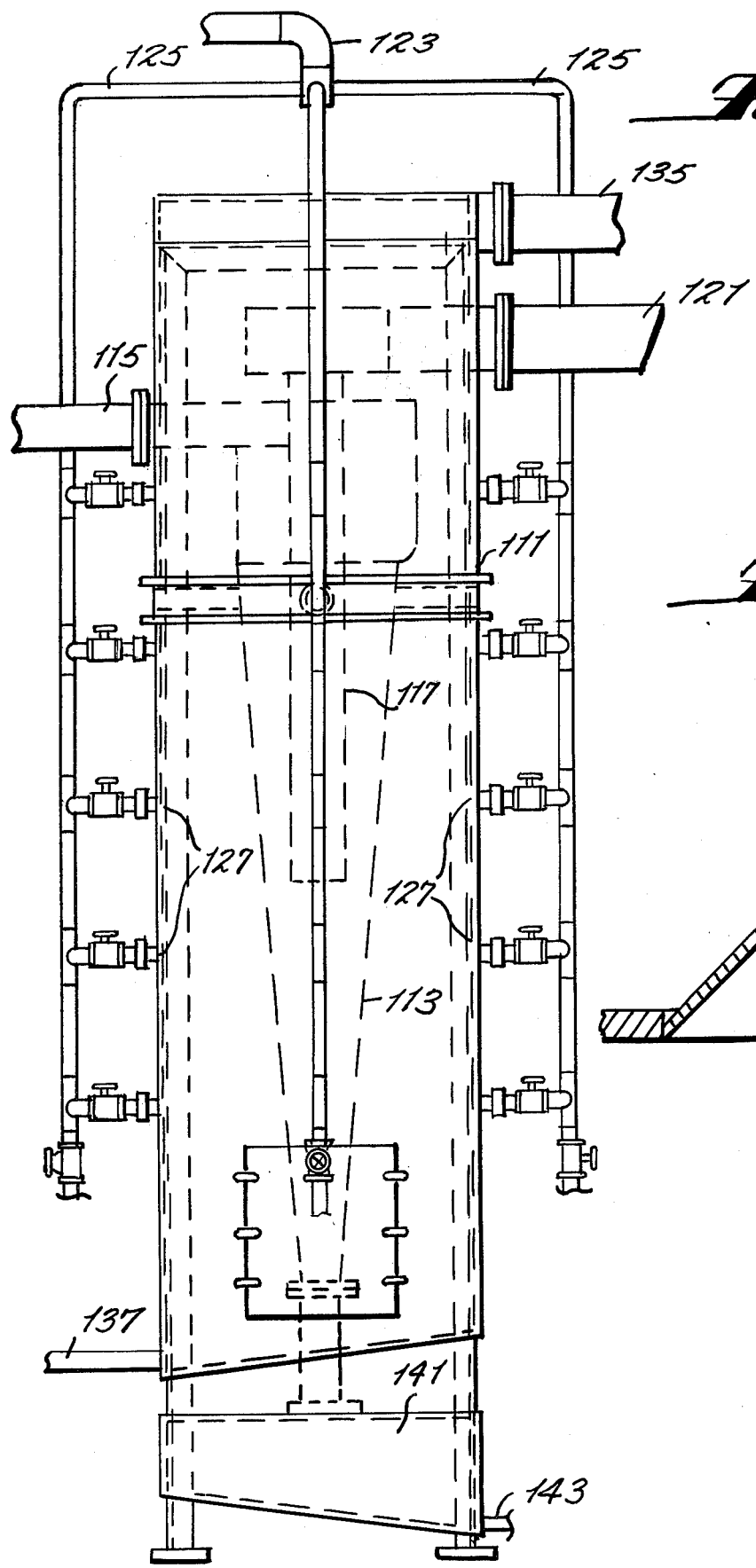

EVAPORATOR-CONDENSER UNIT FOR PRODUCING POTABLE WATER FROM SEWAGE

BACKGROUND OF THE INVENTION

This invention relates to an evaporator-condenser for extracting usable water from the vapor in hot exhaust gases and the water in sanitary liquid waste.

The treatment and disposal of man's waste and discard has become one of the major problems of this technological society. In the past, solid waste has been primarily dumped in land fills and liquid waste has been typically processed by filtering processes or was simply discharged into the nearest available stream. However, because of the contamination of streams, rivers and lakes resulting from the dumping of man's waste and because of the increasing concern for recapturing our vital resources, such as minerals, water and energy, new techniques for efficiently disposing of the increasing mass of solid and liquid waste are required.

One approach to the disposal of solid and liquid waste as well as other materials lies in a combined and interrelated treatment of all of such materials in a single plant which also can be used to produce energy, valuable minerals and potable water. The solid waste can be incinerated, preferably continuously, and the heat generated by that incineration employed as an energy source for the distillation of water from liquid sanitary waste materials. The incombustible material, including metals, glass and the like, can then be recovered from the incinerator and recycled. A copending patent application entitled "Solid Waste and Sanitary Waste Treatment," filed Nov. 14, 1972, Ser. No. 306,383, now U.S. Pat. No. 3,859,174, describes one such integrated treatment plant. In such a plant, there is a need for an evaporator condenser chamber in which liquid sanitary waste can be quickly, efficiently and continuously processed to derive therefrom potable water and to convey solid and other contaminated waste products for further processing.

It, therefore, is an object of this invention to provide an improved evaporator-condenser unit for processing sanitary liquid waste and for deriving potable water therefrom.

SHORT STATEMENT OF THE INVENTION

Accordingly, this invention relates to an evaporator condenser-unit which includes an elongated enclosed chamber having a plurality of fluid conducting tubes extending upright therein about the outer periphery of the chamber. Hot gases from a combustion chamber are introduced into the chamber to form a cyclonic stream therein which gases impinge upon and pass about each of the plurality of tubes. Liquid sanitary waste is pumped into the tubes and is evaporated therefrom because of the heat transferred to the sanitary liquid from the hot gas stream. The evaporated sanitary waste is received in a steam expansion chamber at the top of the cyclonic chamber. The steam is pressurized and injected into the flow stream of the hot gases from the incinerator. The hot gases from the incinerator, together with the compressed evaporated sanitary waste water, is cooled by the sanitary liquid waste in the tubes. Accordingly, the liquid condensate which forms on the tubes is blown from the tubes to the outer periphery of the cyclonic chamber and is received in a sump at the bottom of the chamber. This liquid is conveyed away by means of a pump. The hot gases, after having the liquid condensed therefrom, are passed out of the chamber to an output stack.

BRIEF DESCRIPTION OF THE DRAWINGS

Other objects, features and advantages of the present invention will become more fully apparent from the following detailed description, the appended claims and the accompany drawings in which:

FIG. 2 is a section view taken along the lines 2—2 of FIG. 1;

FIG. 3 is a partial fragmentary view of the arrangement for injecting water into the tubes of the evaporator-condenser;

FIG. 4 is a section view of the nozzle arrangement for the tubes of the evaporator-condenser;

FIG. 5 is a partial section view illustrating the manner in which the tubes terminate in the steam expansion chamber of the evaporator condenser; and FIG. 6 is an alternate embodiment of the present invention.

DETAILED DESCRIPTION OF THE PREFERRED EMBODIMENT

Figure 1:
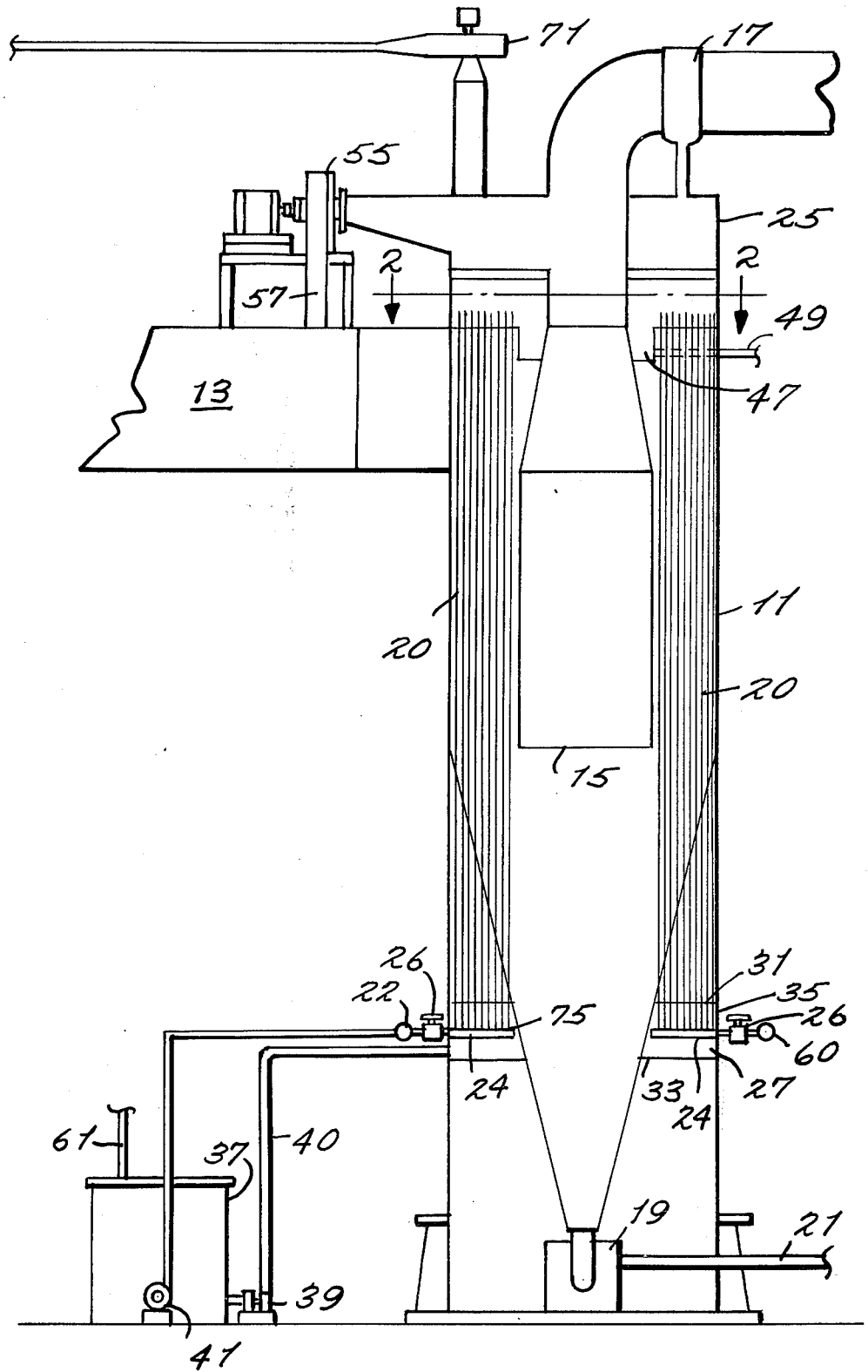
FIG. 1 is a schematic view of the evaporator-condenser of the present invention.

In the processing of solid and liquid waste, solid waste is conveyed to an incinerator wherein the combustible portion of the solid waste is burned, thereby generating very hot gases which contain, among other things, vaporized water.

It is at once desirable to extract the vapor from the hot incincerator gases as well as to extract potable water from sanitary waste liquid. Accordingly, refer to FIG. 1 of the drawings where an evaporator-condenser unit for extracting the water vapor from hot incinerator gases and for extracting distilled water from sanitary waste is disclosed. An elongated chamber 11 of generally cylindrical design is disclosed, although it should be appreciated that the chamber 11 can be of any suitable cross-sectional shape. At the top of the chamber 11 is an inlet 13 for conducting hot gas from, for example, an incinerator. The inlet 13 to the chamber 11 is made at a predetermined radial distance from the center of the elongated chamber 11 so that the hot gases being blown into the chamber generate a cyclonic or spiral movement about the inside of the chamber. Positioned in the center of the chamber and extending downwardly from the point at which the hot exhaust gases are introduced thereto is a baffle member 15 which in the preferred embodiment is of a circular cross-sectional shape. The lower end of the baffle 15 extends approximately half way into the chamber 11 from the top thereof and the other end of the baffle terminates in a mist eliminator 17 which acts as a precipitator for precipitating solid particulate matter passing out through the baffle to a cooling stack not shown.

The bottom of the chamber 11 is formed in an inverted cone shape, i.e., in the form of a funnel, in order to direct from water form the side walls of the chamber 11 into a seal tank 19. The seal tank has an overflow valve, not shown, by which the condensed water is pumped to a holding tank via pipe 21 when the water level in the tank reaches a predetermined level. A plurality of tubes is spaced about the inside periphery of the chamber 11 which tubes terminate at the upper end in a steam expansion chest 25 and at the lower ends in a sealed chamber or head box 27. The head box 27 is defined by the side walls of the funnel-shaped lower portion of the chamber 11, the upper wall 31 and lower wall 33 extending continuously about the funnel-shaped lower portion of the chamber 11. The outside periphery of the head box is formed by a continuous outer wall 35.

Fluid, such as water or liquid sanitary waste, is pumped into the head box 27 from a surge tank 37 by means of a low pressure pump 39. In addition, as we will more fully explain hereinbelow, water or sanitary waste is pumped into a plurality of nozzle arrangement 75 in the head box via a high pressure pump 41. At the upper end of the chamber 11, the steam expansion chest 25 completely encloses the top of the chamber and has a sump portion 47. Communicating the sump portion 47 to the outside is a line 49 which is large enough to easily convey particulate matter. The steam expansion chest 25 terminates in a vapor compressor 55 of conventional design. The vapor compressor 55 compresses the vapor within the steam chest 25 and then injects the compressed vapors into the hot gas stream entering the input 13 via channel 57.

Refer now briefly to FIG. 2 where there is disclosed a section view of the evaporator-condenser of FIG. 1 taken along the lines 2—2 of FIG. 1. The inlet 13 is shown connected to the chamber 11 at a tangential portion of the chamber in order to generate a cyclonic wind movement of the hot incinerator gases. The hot incinerator gases are then forced to impinge upon and move about the tubes 20 which extend from the head box 27 into the steam expansion chest 25 to thereby heat the tubes and the material conveyed therein. Also shown, is the position in which the channel 57 conveys compressed vapor products into the hot gas stream from the vapor compressor 55. As in the preferred embodiment, there are approximately 2,000 vertically oriented tubes in the vapor compressor. However, it should be understood that as many tubes as desirable may be utilized and the cross-sectional dimensions thereof may vary in accordance with the type of sanitary waste products being conducted therethrough.

Refer now back to FIG. 1 where the manner of operation of the invention will now be described in some detail. Sanitary waste water from a treatment area, not shown, is conducted via pipe 61 to the top of a surge tank 37. The water is temporarily stored in a surge tank 37 before being pumped into the evaporator-condenser unit. Approximately two-thirds of the sanitary waste water in the surge tank is pumped into the head box 27 by a low pressure pump 39. This sanitary waste water is then forced up through the tubes 20 rather slowly in order to provide a cooling of the tubes 20. At the same time, hot gas from an incinerator or, for that matter, from the exhaust from a turbine engine which burns fuel oil or from the exhaust of a fuel-burning steam boiler or other such hot waste gas generator is coupled to the input 13 of the evaporator condenser. Since the input 13 to the evaporator-condenser is in communication with the chamber 11 at the periphery thereof, a cyclonic wind action is generated by the hot exhaust gases. This cyclonic wind impinges upon and passes about the pipes 20 as the exhaust gases are forced in a spiral manner downwardly about the inside of the chamber 11. This causes vapors in the exhaust gas to condense on the pipes 20 and because of the force of the cyclonic wind, the condensate is driven away from the side walls of the pipes or tubes and against the wall of the chamber 11 where the condensed vapors fall under the force of gravity into the seal tank 19. At the same time, the hot gases from the incinerator heat the liquid waste products in the tubes 20 thereby causing the waste liquid to vaporize and pass upward into the steam expansion chest 25. As the hot gases continue to spiral downwardly within the chamber 11, they form a vortex in the funnel portion thereof and are forced up through baffle 15 past mist eliminator 17 to an output stack where the hot gases, stripped of water vapor and particulate matter by the mist eliminator 17, are emitted into the atmosphere.

The evaporated water in the expansion chest 25 is withdrawn by the vapor compressor 55 thereby creating a negative pressure on the suction side thereof corresponding to the desired evaporation temperature which is typically 160°F. and creating a positive pressure on the discharge side thereof through channel 57 corresponding to the desired temperature at which the vapors are discharged into the gas stream which typically is 250°F.

There is a substantial quantity of dissolved or particulated waste matter which was initially in the sanitary waste water. This waste matter is precipitated as the evaporated water expands in the steam expansion chest. The precipitated waste matter falls to the floor of the steam chest and into the sump portion thereof 47.

In order to prevent clogging of the pipes 20 and to carry away the precipitated waste matter, a high pressure pump 41 is provided for forcing sanitary waste water under high pressure into the tubes 20. The sanitary waste water is forced under high pressure from pump 41 into a distributing pipe 22 which extends about the outside of the housing 11. Solenoid operated valves 26 are positioned about the outside of the housing 11 and are automatically timed to sequentially permit the waste water to flow under pressure into radial pipes 24, each radial pipe 24 having waste water coupled thereto a preset number of times per hour. A plurality of nozzles 75, as best seen in FIG. 5, are connected to each radial pipe 24 to communicate the high pressure waste water with the tubes 20. Thus, in a selected time sequence, waste water under high pressure is forced into selected radial lines of tubes 20 to force the liquid and waste matter therein upward into the steam expansion chest to thereby periodically clean out the tubes 20. Since the movement of the liquid waste is very rapid, very little evaporation occurs and, accordingly, the liquid waste falls into the sump 47. This waste matter is then carried away for further processing via outlet pipe 49. In the preferred embodiment, approximately one-third of the sanitary waste water is utilized for this blow down purpose.

If desired, a second vapor compressor 71 may be utilized for compressing and utilizing the vapors in the steam expansion chest 25. Thus, the vapors compressed by compressor 71 could be utilized to drive auxiliary equipment or for any other desirable use.

Refer now to FIG. 3 which is a partial section view illustrating the manner in which the sanitary waste water is conducted to the head box 27 and then forced upward into the tubes 20. Illustrated in FIG. 3 is a single radial line of 18 tubes. The tubes are supported at their lower end by means of wall 31 which is fixedly secured to the evaporator-condenser unit. As illustrated, the tubes each terminate in a funnel connector 73 and jet eductor nozzle 75 which can be more easily seen from viewing FIG. 4. The funnel is fixedly secured to the side wall 31 and permits fluids coupled into the head box 27 to pass about the high pressure nozzle 75 and upward into the tube 20. Referring back to FIG. 3, the line 40 extends from the low pressure pump 39 to the head box 27 and conveys sanitary waste water under low pressure into the head box for eventual conduction up through the tubes 20. In addition, the sanitary waste water is conducted under high pressure to a high pressure distributor pipe 22 for the purpose of blowing down the liquid within the tubes 20. This waste liquid which at a pressure of, for example 100 psi, is sequentially coupled to one of a plurality of radially directed discharge lines 24 through an automatic timer valve 26. Thus, a plurality of radially extending connecting pipes 24 are positioned about the head box, one pipe each for a radial line of tubes 20. The solenoid operated automatic timer valve 26 is operated to provide a continual blow down. Thus, as aforementioned, each pipe 24 has waste water under pressure coupled thereto in a timed sequence, the timing, pressure and flow rate being adjusted so that the required volume of waste liquid containing the concentrated solids required to clear the tubes 20 of congested solid particulate matter is coupled to the pipe 20. The liquid under pressure in line 24 is then conveyed through extension tubes 28 to the associated nozzle 75 and is then forcibly sprayed upward into the tube to clear the tubes 20 of any particulate matter therein. However, because of the high velocity of the blow down liquid passing through the tubes 20, little if any of the blow down liquids are evaporated and, accordingly, these liquids pass directly into the steam expansion chest 25 and are collected in the sump portion thereof 47.

Refer now to FIG. 5 which shows a partial section view of the lower portion of the steam expansion chamber 25. The tubes 20 are shown terminating in open ends in the steam expansion chest 25. The liquid egressing from the tubes falls upon the upper wall 32 of the cyclone chamber 11 and flows into a sump 47. As illustrated, the upper wall 32 is substantially horizontal; however, it should be understood that the wall 32 could be inclined inwardly in the form of a funnel to aid the flow of waste liquid into the sump 47. The sump has at least one pipe 49 communicating therewith to conduct away both the blow down liquid forced up through the tubes 20 and precipitated particulate matter which falls into the sump when slower moving liquid within the tubes 20 evaporates due to the heat conveyed thereto by means of the hot gas from the incinerator. The liquid from the sump 47 may be appropriately conveyed to a flash dryer such as disclosed in copending U.S. patent application Ser. No. 473,675 and entitled Flash Reactor Unit, or to other suitable utilization means.

Refer now to FIG. 6 where there is disclosed an alternate embodiment of the evaporator-condenser of the present invention. As illustrated, an elongated chamber 111 is provided which completely encloses cyclone chamber 113. A duct 115 is provided for conducting hot gases tangentially with respect to the cyclone chamber so as to form a downwardly spiraling cyclonic wind of hot gases. The cyclone chamber is generally of a funnel shape over a substantial portion of its length. An inner baffle 117 is provided into which the hot cyclonic gases enter and pass upward through the chamber 113 to an outlet exhaust stack 121. Sanitary waste waters are conveyed to the evaporator condenser via pipe 123 and distributor lines 125 of which in the preferred embodiment, there are four. It, of course, should be understood that there may be more than four such pipes if desired. Each of the lines 125 has a plurality of spray nozzles 127 connected thereto and positioned inside the walls of the evaporator condenser 111. The water is atomized by the spray nozzles 127 and heated by the hot gases entering duct 115. The resulting vaporized water rises within chamber 111 and is conducted to a suitable vapor condenser via duct 135. The atomized water which is not sufficiently heated to vaporize drops to the floor of the chamber 111 and is conducted to an evaporator tank via line 137. At the same time that the water being atomized by nozzles 127 is vaporized, the water vapor in the hot gas stream entering the cyclonic chamber 113 condenses on the walls of the chamber because of the cooling effect of the atomized water. The resulting condensation or water droplets fall to the bottom of the funnel-shaped chamber 113 and into a tank 141 at the bottom of the evaporator-condenser unit. This water is conducted away to a pressure filter via pipe 143.

An evaporator-condenser unit has been disclosed by which water vapor in exceedingly hot exhaust gases can be condensed and utilized as potable water or otherwise and, in addition, a evaporator-condenser unit has been disclosed wherein the water from liquid sanitary waste can be recovered and applied to a useful purpose. The evaporator-condenser unit, accordingly, operates very efficiently using only the typical available resources in a sewage treatment system and, accordingly, extra additional energy is not required from an outside source for performing the evaporation and condensing function of the unit. Further, the products generated by the evaporator-condenser unit are such that they can be easily handled for further processing and utilization.

While the present invention has been disclosed in conjunction with a preferred embodiment thereof, it should be understood that there may be other obvious variances of the present invention which fall within the spirit and scope of the invention as defined by the appended claims.

What is claimed is:

1. An evaporator-condenser unit comprising an elongated enclosed housing defining a chamber therein,
    means for introducing hot combustion gases into the upper portion of said chamber, said gases being forced in a cyclonic wind downwardly about the inside periphery of said chamber,
    an array of tubes positioned about the inside periphery of said chamber, said hot gases impinging upon and passing about said tubes,
    means for periodically cleaning said tubes of particulate matter, said cleaning means including a plurality of injection nozzles, one each positioned at the mouth of a corresponding tube,
    means for pumping relatively cool sanitary waste water up through said tubes, said waste water cooling said tubes to thereby provide a plurality of surfaces upon which the water vapor in said hot gases are condensed, the cyclonic wind action of said gases in said chamber forcing said condensation from said tubes downwardly in said chamber,
    means for collecting said condensation proximate the bottom of said chamber, and
    means for conducting said gases away from said chamber after passing through said array of tubes.

2. The evaporator-condenser of claim 1 further comprising blow-down means for periodically clearing each of said tubes of particulate matter.

3. The evaporator-condenser of claim 2 wherein said means for periodically clearing said tubes of particulate matter includes
  means for periodically conveying a liquid under a relatively high pressure to a selected plurality of said tubes, said liquid and particulate matter lodged in said tubes being blown out of said tubes into said steam collector, and
  means for conveying said liquid and particulate matter from said steam collector.

4. An evaporator-condenser unit comprising in combination
  an elongated vertically oriented enclosed housing defining a chamber therein,
  means for introducing hot combustion gases into the upper portion of said chamber proximate the outer periphery thereof, said gases thereby forming a downwardly directed cyclonic wind within said chamber,
  an array of vertically oriented tubes positioned about the inside periphery of said chamber, said hot gases impinging upon and passing about said tubes,
  means for periodically cleaning said tubes of particular matter, said cleaning means including a plurality of injection nozzles, one each positioned at the mouth of a corresponding tube,
  means for forcing relatively cool sewage water up through said tubes under a relatively low pressure, said water cooling said tubes to thereby provide a plurality of condensation surfaces upon which the water vapor in said hot gases are condensed, the cyclonic wind action of said gases in said chamber forcing said condensation from said tubes downwardly in said chamber,
  means for collecting said condensation proximate the bottom of said chamber,
  a steam collector positioned above said elongated housing and having the open ends of said tubes extending into and terminating therein, said water in said sewage being vaporized by said hot gases impinging upon and passing about said tubes, said vapors being collected in said steam collector, and
  means for injecting said steam into the stream of hot gases flowing into said chamber, said steam thereby being condensed and collected proximate the bottom of said chamber.

5. An evaporator-condenser unit comprising in combination:
  an elongated vertically oriented enclosed housing defining a chamber therein,
  means for introducing hot combustion gases into the upper portion of said chamber proximate the outer periphery thereof, said gases thereby forming a downwardly directed cyclonic wind within said chamber,
  an array of vertically oriented tubes positioned about the inside periphery of said chamber, said hot gases impinging upon and passing about said tubes,
  means for forcing relatively cool sewage water up through said tubes under a relatively low pressure, said sewage water cooling said tubes to thereby provide a plurality of condensation surfaces upon which the water vapor in said hot gases is condensed, the cyclonic wind action of said combustion gases in said chamber forcing said condensation from said tubes downwardly in said chamber,
  means for collecting said condensation proximate the bottom of said chamber,
  a steam collector positioned above said elongated housing and having the open ends of said tubes extending into and terminating therein, said water in said sewage being evaporated by said hot gases impinging upon and passing about said tubes, said vapors being collected in said steam collector,
  means for drawing a partial vacuum in said steam collector to thereby lower the temperature at which said sewage water vaporizes and wherein said sewage water is pumped into said tubes at such a rate that the water substantially is vaporized by the time the water reaches said steam collector,
  means for periodically clearing said tubes of particulate matter.
  said cleaning means including a plurality of injection nozzles, one each positioned at the mouth of a corresponding tube,
  means for separating the water vapor remaining in said hot gases as said gases are exhausted from said chamber, said separated water vapor being conducted into said steam collector, and
  means for injecting said steam into the stream of hot gases flowing into said chamber, said steam thereby being condensed and collected proximate the bottom of said chamber.

6. An evaporator-condenser unit comprising in combination:
  an elongated vertically oriented enclosed housing defining a chamber therein,
  means for introducing hot combustion gases into the upper portion of said chamber proximate the outer periphery thereof, said gases thereby forming a downwardly directed cyclonic wind within said chamber,
  an array of vertically oriented tubes positioned about the inside periphery of said chamber, said hot gases impinging upon and passing about said tubes,
  means for forcing relatively cool sewage water up through said tubes under a relatively low pressure, said water cooling said tubes to thereby provide a plurality of condensation surfaces upon which the water vapor in said hot gases is condensed, the cyclonic wind action of said gases in said chamber forcing said condensation from said tubes downwardly in said chamber,
  means for collecting said condensation proximate the bottom of said chamber,
  a steam collector positioned above said elongated housing and having the open ends of said tubes extending into and terminating therein, said water in said sewage being vaporized by said hot gases impinging upon and passing about said tubes, said vapors being collected in said steam collector,
  means for drawing a partial vacuum in said steam collector to thereby lower the temperature at which said sewage water vaporizes, wherein said sewage water is pumped into said tubes at such a rate that the water substantially is vaporized by the time the water reaches said steam collector,
  means for periodically clearing said tubes of particulate matter, said means including a plurality of injection nozzles, one each positioned at the mouth of a corresponding tube,
  means for selectively coupling liquid under pressure to said nozzles to force said liquid under pressure up through said tubes to said steam collector, said selective coupling means periodically coupling liquid under pressure to each of the tubes in said chamber, means for separating the water vapor remaining in said hot gases as said gases are exhausted from said chamber, said separated water vapor being conducted into said steam collector, and means for injecting said steam into the stream of hot gases flowing into said chamber, said steam thereby being condensed and collected proximate the bottom of said chamber.

* * * * *